United States Patent [19]

Kataoka et al.

[11] Patent Number: 4,844,507
[45] Date of Patent: Jul. 4, 1989

[54] PASSIVE SEAT BELT SYSTEM

[75] Inventors: Sachiro Kataoka, Ebina; Yoichi Iizima; Masaji Kuwahara, both of Tokyo; Seiei Takeoka; Kazuzi Katsutani, both of Yokohama, all of Japan

[73] Assignees: Nissan Motor Co., Ltd., Yokohama; Niles Parts Co., Ltd., Tokyo, both of Japan

[21] Appl. No.: 100,376

[22] Filed: Sep. 24, 1987

[30] Foreign Application Priority Data

Sep. 26, 1986 [JP] Japan ................. 61-227822

[51] Int. Cl.$^4$ .............................................. B60R 21/02
[52] U.S. Cl. ..................... 280/802; 280/804
[58] Field of Search ................. 280/802, 804; 297/469

[56] References Cited

U.S. PATENT DOCUMENTS 3,986,093 10/1976 Wakamatsu et al. ............... 280/802
4,344,502  8/1982 Teraboyashi ........................ 280/802
4,380,751  4/1983 Takada ................................ 280/804

FOREIGN PATENT DOCUMENTS 56-71643  6/1981  Japan .

Primary Examiner—Charles A. Marmor
Assistant Examiner—Ross Weaver
Attorney, Agent, or Firm—Foley & Lardner, Schwartz, Jeffery, Schwaab, Mack, Blumenthal & Evans

[57] ABSTRACT

A passive seat belt system for controllably restraining a passenger in an automotive vehicle in response to the opening and closing states of a vehicle door. The passive seat belt system is comprised of a seat belt which selectively takes a passenger releasing position at which the passenger is released from restraint and a passenger restraining position at which the passenger is restrained. A door switch is provided to output first and second signals when a vehicle door is in opening and closing states, respectively. A control circuit is electrically connected to the door switch and arranged to output a third signal in response to the first signal. A driving device is electrically connected to the control circuit and arranged to drive the seat belt in the direction of the passenger releasing position when being supplied with the third signal from the control circuit. Additionally, an interrupting circuit is electrically connected between a line connecting the door switch and the control circuit and another line connecting the control circuit and the driving device. The interrupting circuit is arranged to prevent the third signal from being supplied from the control circuit to the driving device when the first signal is output from the door switch, thereby preventing the seat belt from being driven to the passenger releasing position even under malfunction of the control circuit to output the third signal.

5 Claims, 2 Drawing Sheets

PASSIVE SEAT BELT SYSTEM

BACKGROUND OF THE INVENTION

1. Field of the Invention

This invention relates to a passive seat belt system mounted in a vehicle such as an automotive vehicle, and more particularly to the passive seat belt system arranged to prevent a seat belt from being driven forward to reach its passenger releasing position during vehicle cruising even under malfunction of a control circuit due to various noise from the outside of the vehicle, thereby improving safety of a vehicle passenger.

2. Description of the Prior Art

A variety of passive seat belt systems have been proposed and put into practical use in the field of automotive vehicles. One of them is disclosed in Japanese Patent Provisional Publication No. 56-71643 in which a seat belt is provided to restrain the breast section of a vehicle passenger in the vehicle. The seat belt is engaged at its lower end section with a retractor disposed on the floor of the vehicle. The upper end section of the seat belt is movably engaged with and movable selectively forward and rearward along a roof rail extending in the fore-and-aft direction of the vehicle, in which the upper end section is moved forward when the door is opened thereby to facilitate seating action of the passenger while moved rearward when the door is closed thereby to restrain the passenger.

However, in such a conventional seat belt system, a control section for controlling operation of the seat belt usually employs a microcomputer and carries out complicated control at high speed, and therefore there is a possibility of making runaway of control program when strong noise is applied to the control section from the outside of the vehicle during vehicle cruising. This may drive the upper end section of the seat belt forward although the vehicle door is closed thereby unavoidably releasing the passenger from restraint by the seat belt, thus degrading safety for the vehicle passenger.

SUMMARY OF THE INVENTION

A passive seat belt system of the present invention is comprised of a seat belt for restraining a passenger in a vehicle. The seat belt selectively takes a passenger releasing position at which the passenger is released from restraint, and a passenger restraining position at which the passenger is restrained. A door switch is provided to detect the opening and closing states of a vehicle door. A first driving device is provided to drive the seat belt in the direction of the first position when the opening state of the vehicle door is detected by the door switch. A second driving device is provided to drive the seat belt in the direction of the passenger restraining position when the closing state of the vehicle door is detected by the door switch. Additionally, an interrupting device is provided to disable the second driving device from driving the seat belt when the closing state of the vehicle body is detected by the door switch.

Accordingly, when the vehicle door is closed, the interrupting device disables the first driving device from driving the seat belt in the passenger releasing position. As a result, if strong noise is applied to a control device of the passive seat belt system from the outside of the vehicle thereby making malfunction of a control circuit, the seat belt cannot be driven forward or toward the passenger releasing position, thereby improving safety of the passive seat belt.

DETAILED DESCRIPTION OF THE INVENTION

Figure 1:
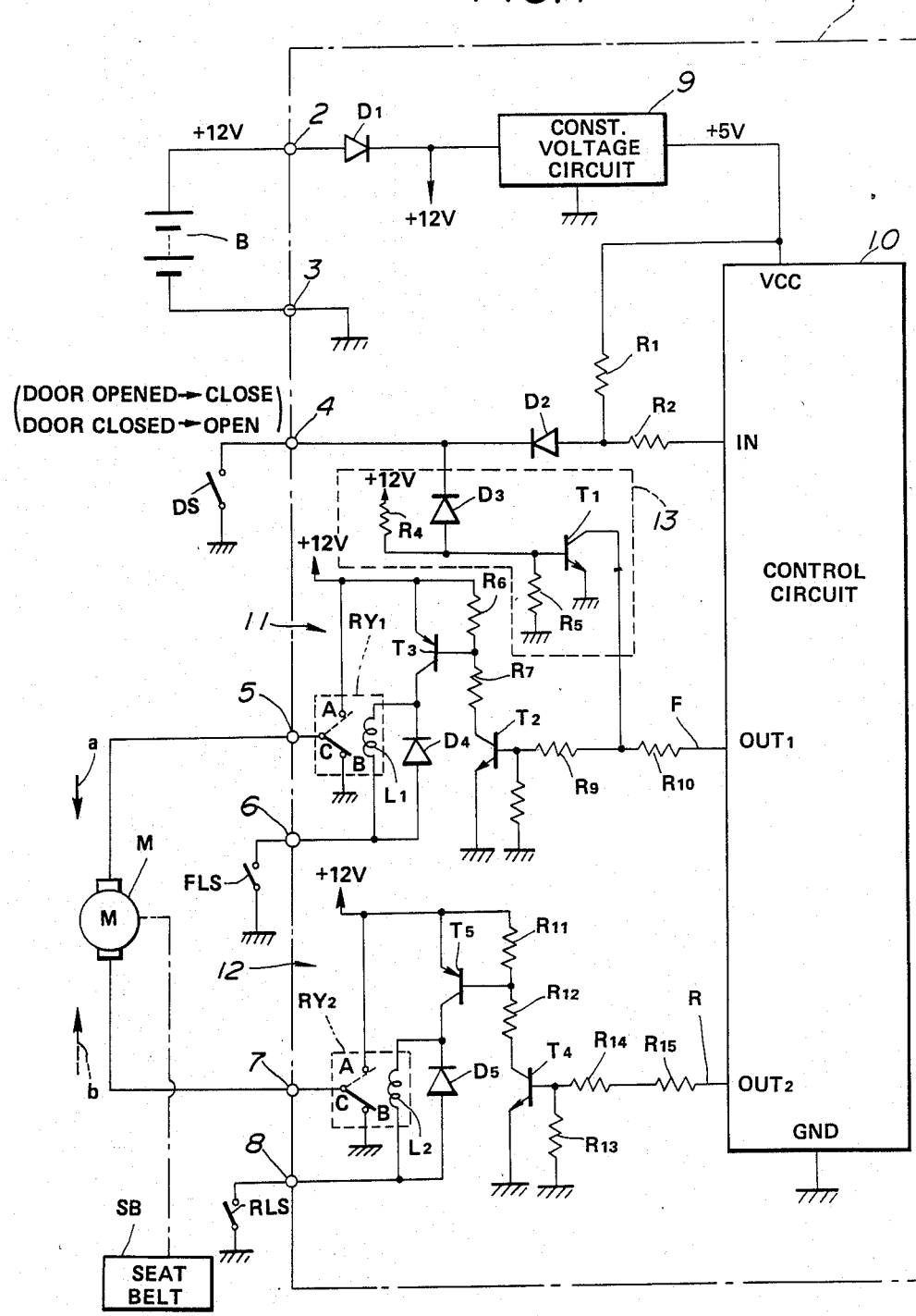
FIG. 1 is a circuit diagram of an embodiment of a passive seat belt system in accordance with the present invention.

Referring now to FIG. 1, there is shown an embodiment of a passive seat belt system in accordance with the present invention. The seat belt arrangement in this case is equipped in an automotive vehicle and is comprised of a seat belt SB which is installed in the vehicle so as to restrain the passenger in the vehicle. The seat belt SB is driven by a motor M and arranged to take selectively its passenger releasing position at which the passenger is released from restraint by the seat belt, and a passenger restraining position at which the passenger is restrained. More specifically, the seat belt SB has a lower end section connected to a retractor secured to the floor of the vehicle and an upper end section movably engaged with a roof rail extending generally in the fore-and-aft direction of the vehicle, though not shown. The seat belt upper section is moved forward along the roof rail thereby to put the seat belt in the passenger releasing position while moved rearward thereby to put the seat belt in the passenger restraining position. The motor M is electrically connected to a printed circuit board 1 providing a control circuit 10 constituted by a microcomputer. The control circuit 10 is electrically connected through a constant voltage circuit 9 to an on-board battery B for supplying direct current voltage.

The motor M is electrically connected to a driving circuit or first driving means 11 and to another driving circuit or second driving means 12 both provided in the printed circuit board 1. The driving circuit 11 is adapted to cause the motor M to rotate in a normal direction so as to move the seat belt upper end section forward along the roof rail thereby putting the seat belt SB into its passenger releasing position. The driving circuit 12 is adapted to cause the motor M to rotate in a reverse direction so as to move the seat belt upper end section rearward along the roof rail thereby putting the seat belt SB into its passenger restraining position. Additionally, an interrupting circuit 13 is provided in the printed circuit board 1 and electrically connected between the driving circuit 11 and the control circuit 10. The interrupting circuit 13 is adapted to compulsorily disable the driving circuit 11 to operate when a vehicle door (not shown) is closed. The opening and closing states of the door are detected by a door switch DS which is adapted to be closed when the door is opened (or in opening state), while opened when the door is closed (or in closing state). Thus, the door switch DS is operated in relation to the operation of the door.

The interrupting circuit 13 causes a transistor $T_1$ to be put into ON state when the door switch DS is opened upon closing the door, thereby making the voltage at an output terminal $OUT_1$ at zero V and thus maintaining the voltage of the base of a transistor $T_2$ at zero V. A front limit switch FLS is adapted to be opened when the seat belt upper end section is driven forward and reaches a predetermined forward limit position corresponding to the passenger releasing position of the seat belt. A rear limit switch RLS is adapted to be opened when the seat belt upper end section is driven rearward and reached a predetermined rearward limit position corresponding to the passenger restraining position of the seat belt. The printed circuit board 1 is provided with terminals 2 to 8 thereof, diodes $D_1$ to $D_5$, resistors $R_1$ to $R_{15}$, and transistors $T_3$ to $T_5$.

Figure 2:
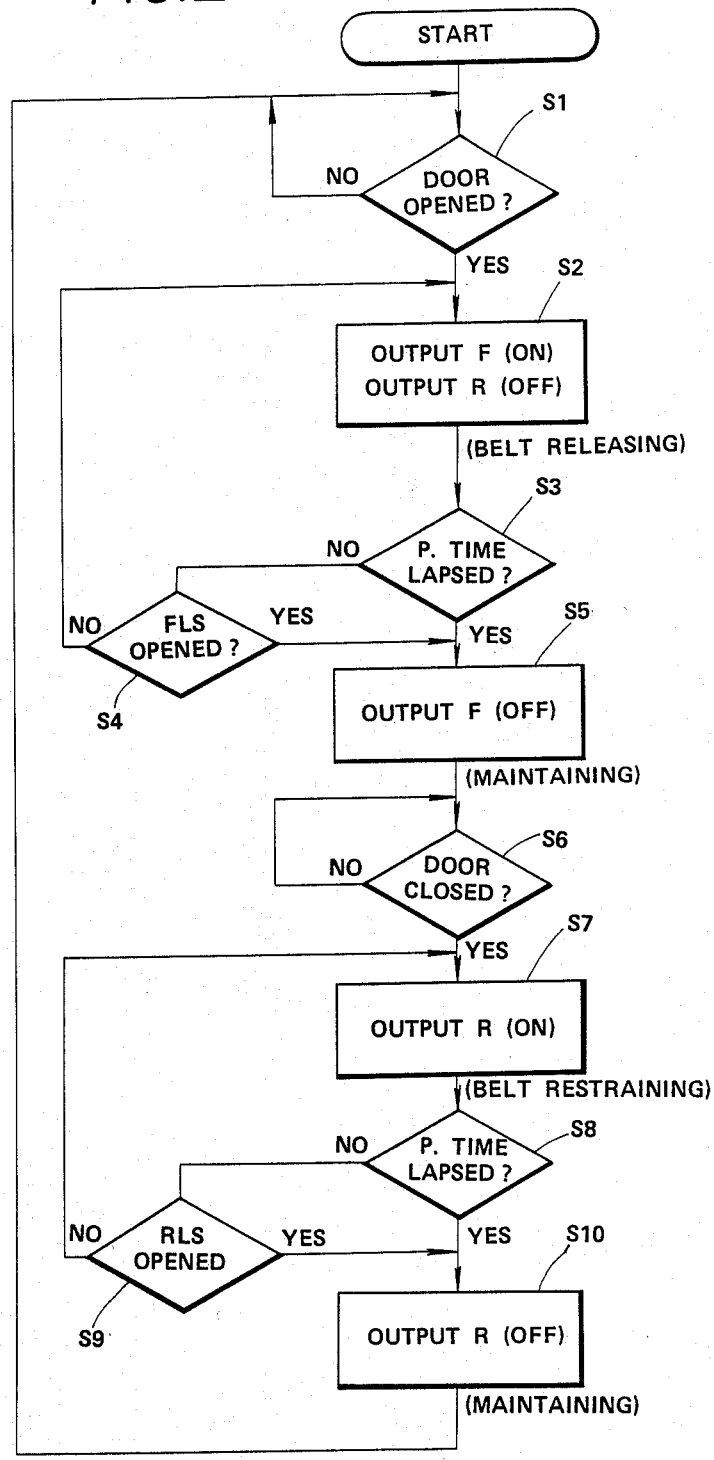
FIG. 2 is a flow chart of program of control procedure of a control circuit in the system of FIG. 1.

The operation of the thus arranged passive seat belt system will be discussed hereinafter with reference to the flow chart of FIG. 2 which shows the control procedure in accordance with the program of the microcomputer in the control circuit 10.

First when the program starts, judgement of whether the door is in closed state or not is made at a step S1 when signal from the door switch DS is input through the terminal 4, the diode $D_2$ and the resistor $R_2$ to the control circuit 10. When the door is in the closed state, stand-by condition is maintained until the door is opened at this step.

When the passenger opens the door, the door switch DS is closed and therefore zero V is established at the terminal 4. Then, a voltage level lowering from +5 V to zero V is made at an input terminal IN of the control circuit 10, the fact that the door is opened is detected, so that the program goes to a step S2. Subsequently, the control circuit 10 outputs ON or "H" level output signal F from the output terminal $OUT_1$ and OFF or "L" level output signal R from the output terminal $OUT_2$, and then the program goes to a step S3 and further to a step S4 in which the above-mentioned output actions from the output terminals $OUT_1$, $OUT_2$ are continued.

The driving circuit 11 receives the "H" level signal F from the control circuit 10 thereby to energize a relay $RY_1$, in which a coil $L_1$ is energized so that a movable contact separates from a contact B and contacts with a contact A thereby allowing electric current to flow from the contact A to a contact C. This allows electric current to flow in the direction of a solid arrow a (in FIG. 1) to the motor M. At this time, the driving circuit 12 receives the "L" level signal R form the control circuit 10 and therefore does not operates or is not energized, in which a coil $L_2$ is not energized so that a movable contact is in a condition in which contacts B, C are connected with each other.

Then, the motor M rotates in the normal direction so that the upper end section of the seat belt is driven and moves forward along the roof rail. When this seat belt upper end section reaches the predetermined forward limit position, the front limit switch FLS becomes opened thereby stopping operation of the driving circuit 11. This causes the seat belt to be located forward thereby to establish a condition the passenger can be seated, and thus the passenger is seated on a vehicle seat.

When stand-by of a predetermined time is completed at the step S3 or when opening of the front limit switch FLS is detected at the step S4, the program goes to the step S6, in which stand-by condition is maintained until the door is closed. When the passenger closes the door, the door switch DS is opened, so that "H" level signal is input to the input terminal IN of the control circuit 10 under the action of the pull-up resistors $R_1$, $R_2$. Accordingly, the control circuit 10 detects the change of signal level at the input teminal IN from "L" to "H" and therefore judges that the door is closed. The program goes to the step S7, so that the control circuit 10 outputs "H" level signal R. At this time, the program goes to a step S8 and further to a step S9, in which stand-by condition is maintained for a predetermined time.

The driving circuit 12 upon receiving the "H" level output signal R energizes the relay $RY_2$, in which a coil $L_2$ is energized thereby to move a movable contact so that the contact C and a contact A are electrically connected. Consequently, electric current flows in the direction of a dotted arrow b (in FIG. 1) to the motor M. At this time, the driving circuit 11 receives "L" level output signal F from the control circuit 10 and therefore does not operate. Then, the motor M rotates in the reverse direction, so that the seat belt upper end section is driven and moves rearward along the roof rail. When the seat belt upper end section reaches the rearward limit position, the rear limit switch RLS is opened thereby stopping operation of the driving circuit 12. Then, the seat belt restrains the breast section of the passenger seated on the vehicle seat.

When stand-by of a predetermined time is completed at a step S8 or when opening of the rear limit switch RLS is detected, the program goes to a step S10 in which the control circuit 10 outputs OFF or "L" level output signal R thereby completely stopping the operation of the driving circuit 12. Then, the program goes back to "START", and stand-by is maintained in the condition of judgement of whether the door is opened or not, at the step S1.

The operation will be further discussed on the assumption that strong noise from the outside of a passenger compartment of the vehicle is applied or mixed to the grounding line, the power source line and the like so that the program of the control circuit 10 is confused to make runaway in such a manner that "H" level output signal F is erroneously outputs from the output terminal $OUT_1$ although the door is not opened or in the closing, in case stand-by condition is maintained at the step S1 carrying out a routine of detecting the opening state of the door while the door is kept closed.

If the control circuit 10 erroneously outputs the "H" level output signal F from the output terminal $OUT_1$ on malfunction thereof, the interrupting circuit 13 has already maintained the transistor $T_1$ in ON state, so that the output signal F is grounded through the resistor $R_{10}$ and the collector and emitter of the transistor $T_1$. Thus, the output signal cannot be transmitted to the driving circuit 11. Consequently, the seat belt upper end section is never moved forward so that the passenger is maintained restrained by the seat belt.

What is claimed is:
1. A passive seat belt system comprising:
a seat belt for restraining a passenger in a vehicle, said seat belt selectively taking a first position for releasing the passenger from restraint and a second position for restraining the passenger;
a door switch for detecting the opening and closing states of the vehicle door, said door switch being adapted to output a first signal when the vehicle door is in the opening state and a second signal when the vehicle door is in the closing state;
a control circuit electrically connected to said door switch and arranged to outpout a third signal upon input of said first signal from said door switch;
first driving means electrically connected to said control circuit to drive said seat belt in the direction of said first position when the opening state of the vehicle door is detected by said door switch, said first driving means being adapted to drive said seat belt when fed with said third signal from said control circuit;

second driving means electrically connected to said control circuit to drive said seat belt in the direction of said second position when the closing state of the vehicle door is detected by said door switch, said second driving means being adapted to drive said seat belt when said second signal from said door switch is inputted to said control circuit; and interrupting means for disabling said first driving means from driving said seat belt in the passenger releasing direction when the closing state of the vehicle door is detected by said door switch, said interrupting means including means for preventing said third signal from being fed to said first driving means from said control circuit when the second signal is outputted from said door switch.

2. A passive seat belt system as claimed in claim 1, wherein said first driving means includes a motor which is rotatable in a first direction to drive the seat belt in the direction of the first position upon being supplied with electric current, and a first driving circuit electrically connected between said motor and said control circuit and arranged to supply electric current to said motor upon being supplied with said third signal from said control circuit.

3. A passive seat belt system as claimed in claim 2, wherein said interrupting means includes an interrupting circuit electrically connected between a first line connecting said door switch and said control circuit and a second line connecting said first driving circuit and said control circuit, said interrupting circuit being arranged to prevent said third signal from said control circuit from being supplied to said first driving circuit when said door switch outputs said second signal even in case of malfunction of said control circuit to output said third signal to be supplied to said first driving circuit.

4. A passive seat belt system as claimed in claim 3, wherein said interrupting circuit includes a transistor having a collector electrically connected to said second line, a grounded emitter, and means for putting said transistor in the ON state when said second signal is outputted from said door switch.

5. A passive seat belt system as claimed in claim 1, wherein said interrupting means is electrically connected between said control circuit and said first driving means.

* * * * *